United States Patent
Mukunoki et al.

(10) Patent No.: US 9,564,827 B2
(45) Date of Patent: Feb. 7, 2017

(54) POWER CONVERSION DEVICE

(71) Applicants: Mitsubishi Electric Corporation, Chiyoda-ku (JP); TOSHIBA MITSUBISHI-ELECTRIC INDUSTRIAL SYSTEMS CORPORATION, Chuo-ku (JP)

(72) Inventors: Kaho Mukunoki, Chiyoda-ku (JP); Toshiyuki Fujii, Chiyoda-ku (JP); Osamu Mori, Chiyoda-ku (JP); Shinzo Tamai, Chuo-ku (JP); Sadao Funahashi, Chuo-ku (JP); Yasuhiko Hosokawa, Chuo-ku (JP); Kotaro Higashi, Chuo-ku (JP)

(73) Assignees: Mitsubishi Electric Corporation, Chiyoda-ku (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 14/781,421

(22) PCT Filed: Sep. 4, 2013

(86) PCT No.: PCT/JP2013/073773
§ 371 (c)(1),
(2) Date: Sep. 30, 2015

(87) PCT Pub. No.: WO2014/162620
PCT Pub. Date: Oct. 9, 2014

(65) Prior Publication Data
US 2016/0056727 A1    Feb. 25, 2016

(30) Foreign Application Priority Data

Apr. 2, 2013    (JP) .................................. 2013-076626

(51) Int. Cl.
H02M 7/04    (2006.01)
H02M 7/483    (2007.01)
H02M 7/00    (2006.01)

(52) U.S. Cl.
CPC ............... *H02M 7/04* (2013.01); *H02M 7/003* (2013.01); *H02M 7/483* (2013.01); *H02M 2007/4835* (2013.01)

(58) Field of Classification Search
CPC ........ H02M 7/04; H02M 7/003; H02M 7/483; H02M 2007/4835
See application file for complete search history.

(56) References Cited

U.S. PATENT DOCUMENTS

2013/0119901 A1*    5/2013    Gries ................... H02M 7/003
                                                             307/31
2013/0208514 A1*    8/2013    Trainer ................. H02M 7/04
                                                             363/35

(Continued)

FOREIGN PATENT DOCUMENTS

JP    2011 78213    4/2011
JP    2011 182517    9/2011

(Continued)

OTHER PUBLICATIONS

Fujita et al., "Power Flow Analysis and DC-Capacitor Voltage Regulation for the MMCC-DSCC", IEEJ Transactions on Industry Applications, vol. 132, No. 6, (2012), pp. 659-665.

(Continued)

*Primary Examiner* — Jue Zhang
(74) *Attorney, Agent, or Firm* — Oblon, McClelland, Maier & Neustadt, L.L.P.

(57) ABSTRACT

A power conversion device includes: a DC current calculation unit for calculating a circulating current component for each phase which circulates between the phases through first arms and/or second arms not via an AC power supply and a (Continued)

DC power supply; and a circulating current control unit for controlling the circulating current component for each phase so as to follow a predetermined circulating current command value, thereby reliably suppressing variation in voltages of DC capacitors of unit cells among the phases even in such a case where an impedance is additionally inserted in a DC circuit.

16 Claims, 11 Drawing Sheets

(56) References Cited

U.S. PATENT DOCUMENTS

| | | | | |
|---|---|---|---|---|
| 2013/0229837 | A1* | 9/2013 | Wang | H02M 7/003 363/40 |
| 2014/0268934 | A1* | 9/2014 | Tolbert | H02M 7/04 363/44 |
| 2014/0369096 | A1* | 12/2014 | Hosokawa | H02M 7/04 363/68 |
| 2015/0303822 | A1* | 10/2015 | Casimir | H02M 7/04 363/84 |

FOREIGN PATENT DOCUMENTS

| | | |
|---|---|---|
| JP | 2011 223761 | 11/2011 |
| JP | 2012 44839 | 3/2012 |

OTHER PUBLICATIONS

International Search Report Issued Nov. 12, 2013 in PCT/JP13/073773 Filed Sep. 4, 2013.

Extended European Search Report issued Oct. 31, 2016 in Patent Application No. 13881407.4.

Maryam Saeedifard, et al., "Dynamic Performance of a Modular Multilevel Back-to Back HVDC System", IEEE Transactions on Power Delivery, vol. 25, No. 4, Oct. 2010.

* cited by examiner

US 9,564,827 B2

POWER CONVERSION DEVICE

TECHNICAL FIELD

The present invention relates to a power conversion device which has an arm formed by unit cells each composed of a plurality of semiconductor switches and a DC capacitor, and which performs power conversion between an AC circuit for a plurality of phases and a DC circuit, and particularly, the present invention aims at suppression of variation in voltages of the DC capacitors of the unit cells among the phases.

BACKGROUND ART

In a large-capacity power conversion device, since the converter output has high voltage or large current, a configuration having a plurality of converters in series or parallel in a multiplexed manner is often used. It is known that multiplexing a converter not only increases a converter capacity, but also reduces a harmonic contained in an output voltage waveform by synthesizing outputs, and as a result, can reduce harmonic current flowing into a system.

There are various methods for multiplexing a converter: reactor multiplexing, transformer multiplexing, direct multiplexing, etc. In the case of transformer multiplexing, since an AC side is isolated by transformers, there is an advantage that common DC voltage can be used among the transformers. However, there is a disadvantage that, in the case where output voltage is high, the configuration of the multiplexed transformer is complicated and the cost of the transformer increases.

Considering the above, as a power conversion device that is suitable for high-voltage usage and does not require a multiplexed transformer, a multilevel converter is proposed in which outputs of a plurality of converters are connected in cascade. One example of such multilevel converters is a modular multilevel converter (hereinafter, referred to as an MMC).

The MMC is composed of an arm in which a plurality of unit converters called cells (hereinafter, referred to as unit cells) are connected in cascade. Each unit cell includes a plurality of semiconductor switches and a DC capacitor, and through ON/OFF control of the semiconductor switches, outputs both-end voltage of the DC capacitor and zero voltage.

In the case of three-phase MMC, such an arm is individually formed for each phase, an output end of a half number of cells of total cells connected in cascade is used as an AC terminal, both ends of the arms for respective phases are connected to each other, and their respective terminals are used as DC terminals. Since each unit cell output of the MMC is connected to both sides of the AC end and the DC end of the MMC, each unit cell has a characteristic of outputting both DC current and AC current. That is, current flowing in each arm includes an AC component and a DC component. Therefore, in the MMC, it is necessary to control these plural current components. Examples of such control methods are shown in Patent Documents 1 and 2 and Non-Patent Document 1.

These documents disclose that, in an MMC having a DC side connected to a DC power supply and an AC side connected to an AC power supply, AC current is controlled on the AC side of the MMC, and current obtained by removing a component relevant to AC output from each arm current is controlled on the DC side, thus attaining the above control.

CITATION LIST

Patent Document

Patent Document 1: Japanese Laid-Open Patent Publication No. 2011-182517
Patent Document 2: Japanese Laid-Open Patent Publication No. 2012-44839

Non-Patent Document

Non-Patent Document 1: IEEJ transactions D (on industry applications) Vol. 132, No. 6, 2012 (page 662, FIG. 4)

SUMMARY OF THE INVENTION

Problems to be Solved by the Invention

In the above documents, current obtained by removing a component relevant to AC output from each arm current is a control target, and this current includes a DC current component flowing in the DC power supply, and a circulating current component which flows between the phases through the arms and directly influences variation in voltages of DC capacitors of unit cells among the phases.

Of these controls, in the control of the DC current component, response is mainly determined by an impedance of a DC circuit including the DC power supply, and in the control of the circulating current component, response is mainly determined by an impedance of a circulation closed circuit between the arms.

Therefore, if the two current components are collectively controlled, particularly, in such a case where the DC circuit includes not only the DC power supply but also an impedance inserted in series to the DC power supply, it is impossible to obtain desired operation.

That is, in the case where the DC circuit includes only the DC power supply, a circuit in which the DC current flows has an impedance equivalent to that of a circuit in which the circulating current flows. However, in the case where an impedance is additionally inserted in the DC circuit, the impedance of the DC circuit is connected in series to the impedance of the circuit in which the DC current flows, so that current becomes difficult to flow. Therefore, if both current components are collectively controlled and the response speed is increased, the circulating current component can be stably controlled but the DC current component becomes unstable due to influence of the inserted impedance. On the other hand, if the response is slowed down to stabilize the DC current component, sufficient response is not obtained in the circulating current control, and the circulating current component cannot be caused to always follow an appropriate value.

The present invention has been made to solve the above conventional problems, and an object of the present invention is to obtain a power conversion device capable of reliably suppressing variation in voltages of DC capacitors of unit cells among phases even in such a case where an impedance is additionally inserted in a DC circuit.

Solution to the Problems

A power conversion device according to the present invention is a power conversion device which is connected between an AC circuit for plural phases and a DC circuit and performs power conversion between the AC circuit and the DC circuit, the power conversion device including: a first arm and a second arm provided for each phase and having one ends connected in series to each other. The first arm and the second arm are each composed of one or a plurality of unit cells connected in series to each other, each unit cell being composed of: a series unit including a plurality of semiconductor switches connected in series to each other; and a DC capacitor connected in parallel to the series unit, a terminal of the semiconductor switch serving as an output end of the unit cell. A connection point between the first arm and the second arm for each phase is connected to a corresponding phase of the AC circuit. Another one end of the first arm for each phase is connected to a positive side of the DC circuit, and another one end of the second arm for each phase is connected to a negative side of the DC circuit. The power conversion device further includes: circulating current calculation means for calculating a circulating current component for each phase which circulates between the respective phases not via the AC circuit and the DC circuit; and a circulating current control unit for controlling the circulating current component for each phase so as to follow a predetermined circulating current command value. The power conversion device thereby suppresses variation in voltages of the DC capacitors among the phases.

Effect of the Invention

Since the power conversion device according to the present invention includes the circulating current calculation means and the circulating current control unit as described above, the power conversion device can control the circulating current component which directly influences variation in voltages of the DC capacitors of the unit cells among the phases, independently of other current components, thereby reliably suppressing the variation.

DESCRIPTION OF EMBODIMENTS

Embodiment 1

Figure 1:
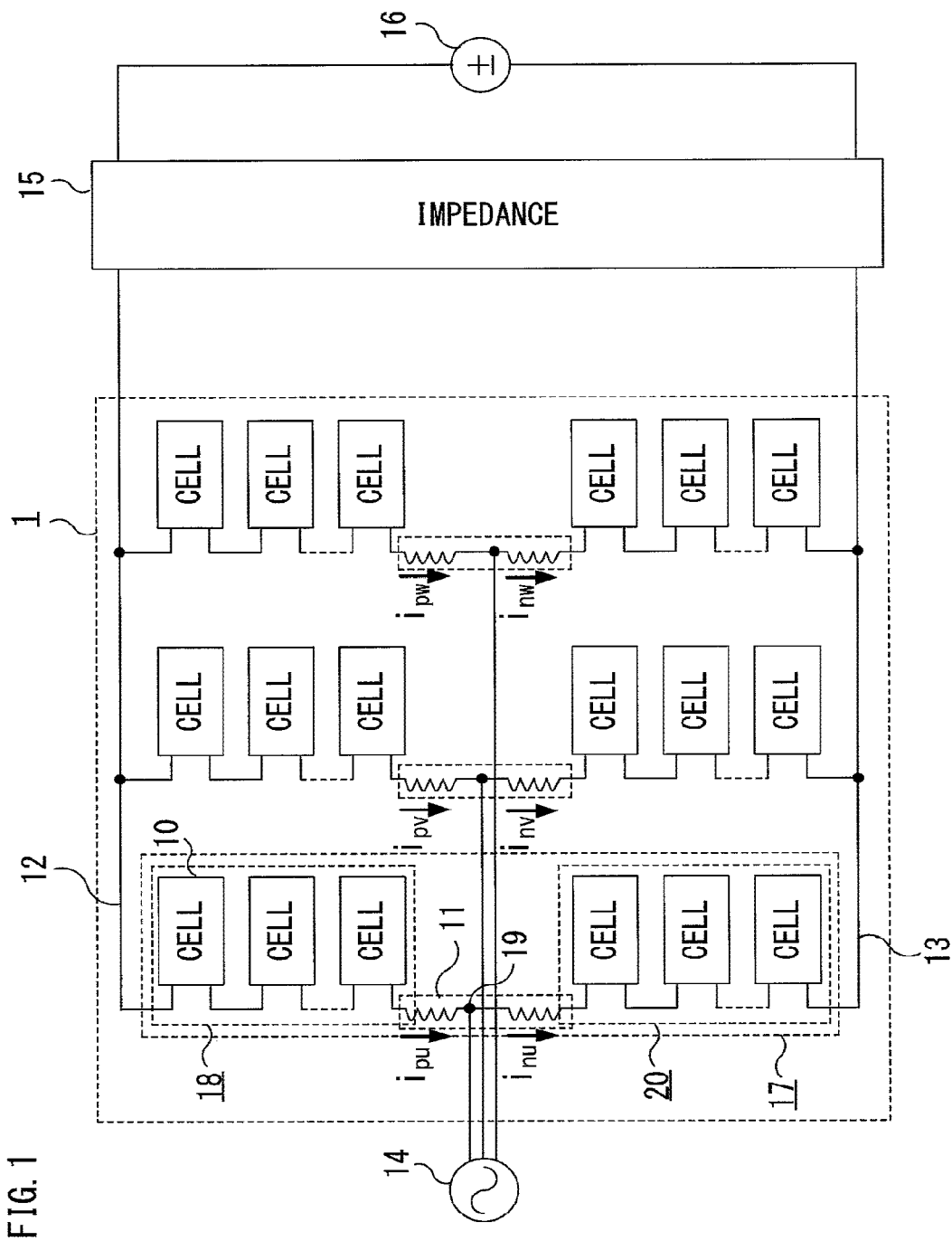
FIG. 1 is a circuit diagram showing the entire configuration of a power conversion device according to embodiment 1 of the present invention.

FIG. 1 is a circuit diagram showing the entire configuration of a power conversion device according to embodiment 1 of the present invention. In FIG. 1, in a power conversion device 1 of the present invention, one of its input/output ends is connected to an AC power supply 14 which is an AC circuit having a plurality of phases (which are exemplified by three phases of u, v, w in FIG. 1), and the other one of the input/output ends is connected to a DC power supply 16 which is a DC circuit, via an impedance 15.

Although one of the input/output ends is directly connected to the AC power supply 14 in FIG. 1, the one input/output end may be connected via an interconnection transformer or may be connected via an interconnection reactor. The other one of the input/output ends may be directly connected to the DC power supply 16 or may be connected to a DC load. The DC power supply 16 may be another power conversion device that performs DC output.

Next, the internal configuration of the power conversion device 1 of the present invention will be described. The power conversion device 1 of the present invention includes arms 17 for respective phases, and each arm 17 is composed of a first arm 18 on a positive side and a second arm 20 on a negative side. The arms 18 and 20 have one ends connected in series to each other, and the connection point corresponds to an AC output end 19 connected to the AC power supply 14. Another one end of the first arm 18 corresponds to a first DC output end 12 connected to a positive side of the DC power supply 16 via the impedance 15. Another one end of the second arm 20 corresponds to a second DC output end 13 connected to a negative side of the DC power supply 16 via the impedance 15.

The first arm 18 includes one or a plurality of unit cells 10 described later and an arm reactor 11 which are connected in series. The same applies to the second arm 20. The arm reactor 11 is inserted for suppressing a circulating current component described later in detail. The insertion position is not limited to the position shown in FIG. 1 as long as the arm reactor 11 is connected in series to the unit cell 10. A plurality of arm reactors 11 may be inserted in a distributed manner.

Figure 2:
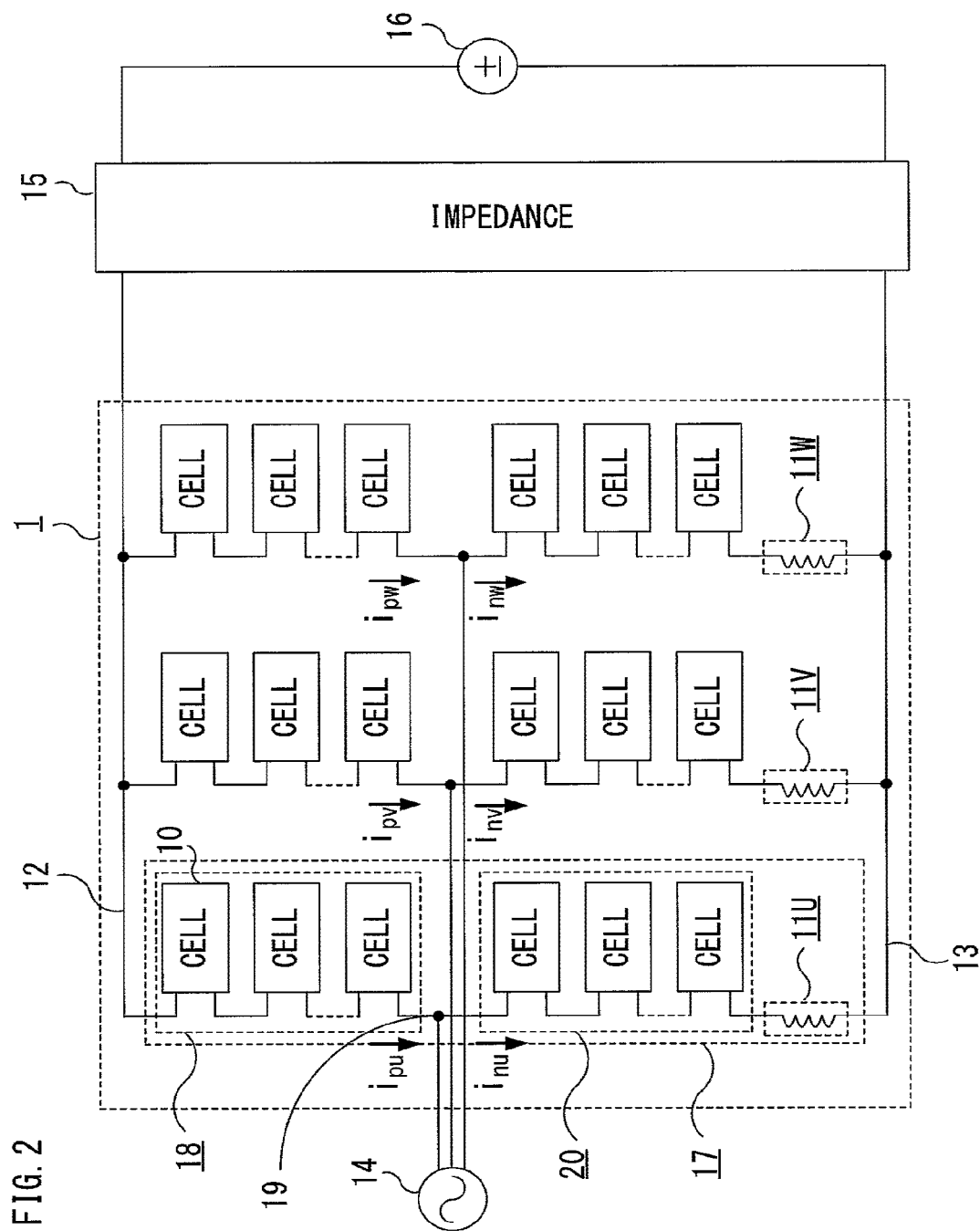
FIG. 2 is a circuit diagram showing the entire configuration of a power conversion device in which an arm reactor 11 is inserted at a position different from that in FIG. 1.

For example, as shown in FIG. 2, the arm reactor 11 may be provided on only the second arm 20, or instead, may be provided on only the first arm 18. Thus, within the arm 17, the insertion position of the arm reactor 11 is not limited to those in FIGS. 1 and 2, and the number of the reactors is not limited thereto.

In the present invention, the arm reactor 11 is not an essential element. In the case of not providing any arm reactor 11, the circulating current component is determined by the value of reactance that exists in a wiring structure itself.

Figure 3:
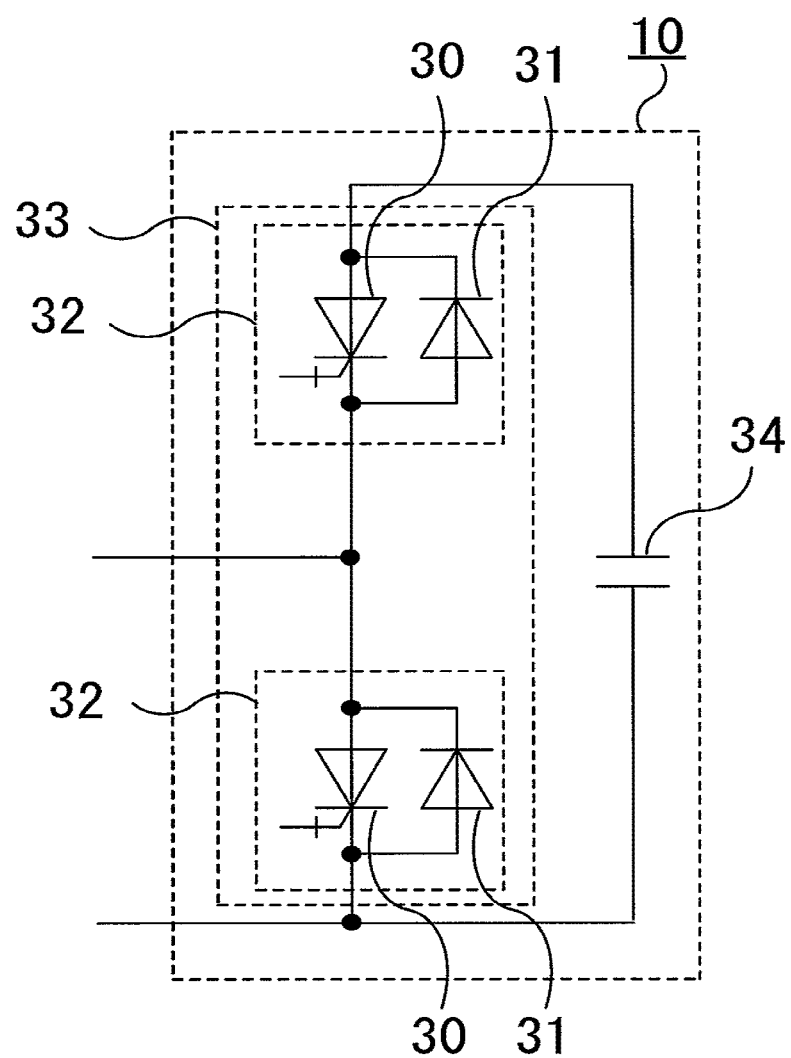
FIG. 3 is a circuit diagram showing an example of the internal configuration of a unit cell 10 in FIG. 1.

FIG. 3 is a circuit diagram showing an example of the internal configuration of the unit cell 10 in FIG. 1, in which a so-called half-bridge configuration is employed. In FIG. 3, the unit cell 10 is composed of: a series unit 33 including a plurality of (here, two) semiconductor switches 32 connected in series, each of which includes a self-turn-off switching element 30 such as a GCT (Gate Commutated Turn-off thyristor) or an IGBT (Insulated Gate Bipolar Transistor), and a diode 31 connected in antiparallel to the switching element 30; and a DC capacitor 34 connected in parallel to the series unit 33. The DC capacitor 34 smooths DC voltage.

As shown in FIG. 3, in the unit cell 10, both ends of one semiconductor switch 32 are used as output ends, and through ON/OFF control of the switching elements 30, both-end voltage and zero voltage of the DC capacitor 34 are outputted from the output ends.

Figure 4:
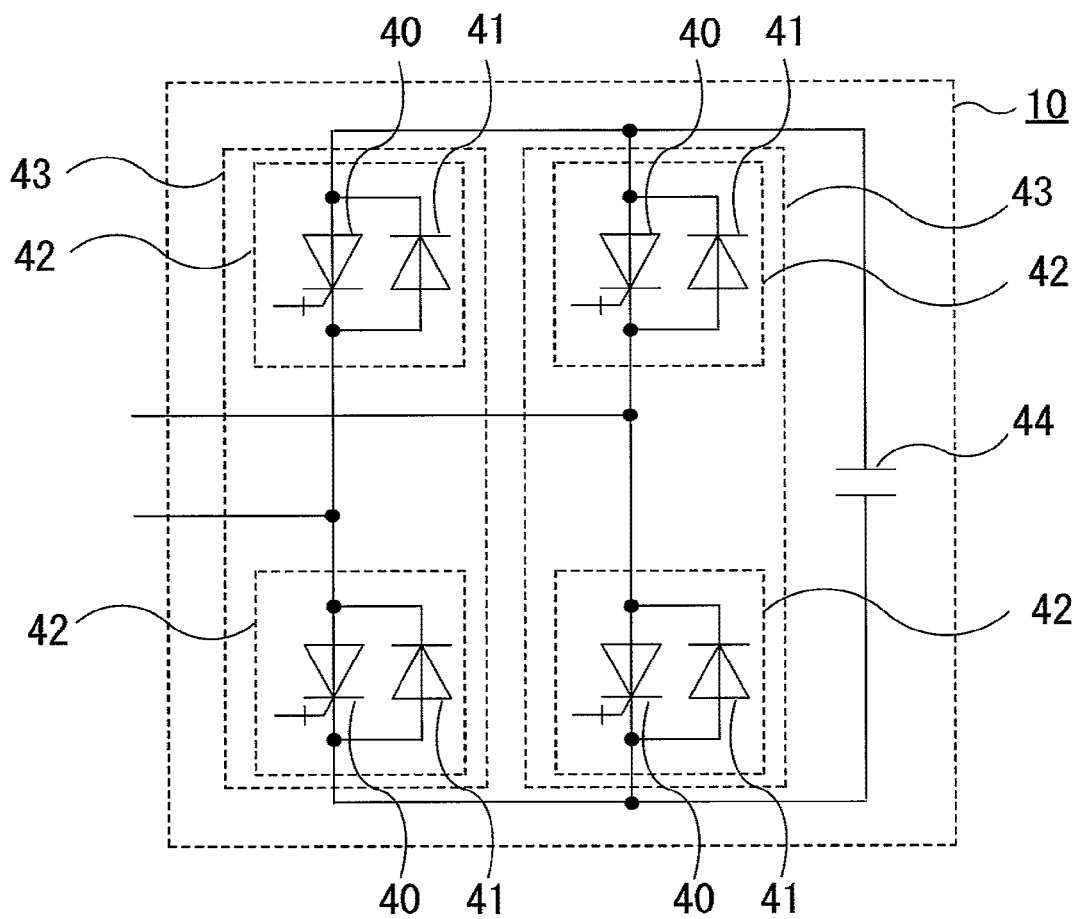
FIG. 4 is a circuit diagram showing another example of the internal configuration of the unit cell 10 in FIG. 1, different from that in FIG. 3.

FIG. 4 is a circuit diagram showing an example of the internal configuration of the unit cell 10 in which a so-called full-bridge configuration is employed. In FIG. 4, the unit cell 10 is composed of: two series units 43 connected in parallel and each including a plurality of (here, two) semiconductor switches 42 connected in series, each of which includes a switching element 40 and a diode 41 connected in antiparallel to the switching element 40; and a DC capacitor 44 connected in parallel to the series units 43.

As shown in FIG. 4, in the unit cell 10, terminals of the semiconductor switches 42 that are intermediate connection points inside the series units 43 are used as output ends, and through ON/OFF control of the switching elements 40, positive voltage, negative voltage, and zero voltage of both ends of the DC capacitor 44 are outputted from the output ends.

The configuration of the unit cell 10 is not limited to those shown in FIG. 3 and FIG. 4 as long as the unit cell 10 is composed of a series unit including semiconductor switches, and a DC capacitor connected in parallel to the series unit, and selectively outputs the DC capacitor voltage from the output ends through operation of the semiconductor switches of the series unit.

Next, control of the power conversion device 1 of the present invention, particularly, control as a major part of the present invention, i.e., control of a circulating current component which circulates between the phases through the first arms 18 and/or the second arms 20 not via the AC power supply 14 and the DC power supply 16 and which directly influences variation in voltages of the DC capacitors 34 (44) of the unit cells 10 among the phases, will be described.

Figure 5:
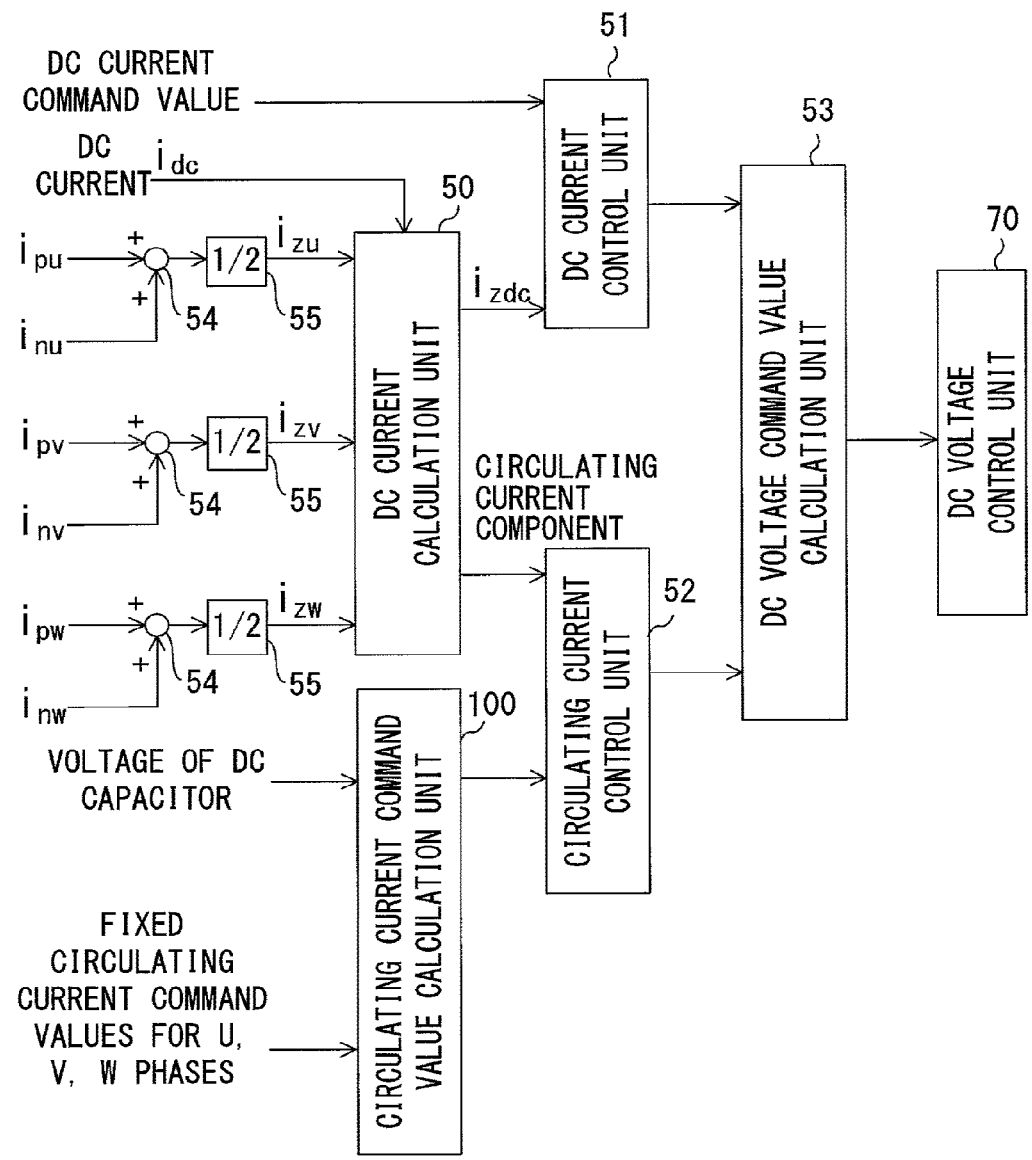
FIG. 5 is a block diagram showing an example of the control configuration of the power conversion device according to embodiment 1 of the present invention.

FIG. 5 is a block diagram showing an example of the control configuration of the power conversion device according to embodiment 1 of the present invention.

Here, before the description of the control configuration in FIG. 5, current elements flowing in the power conversion device will be described based on FIG. 6.

Figure 6:
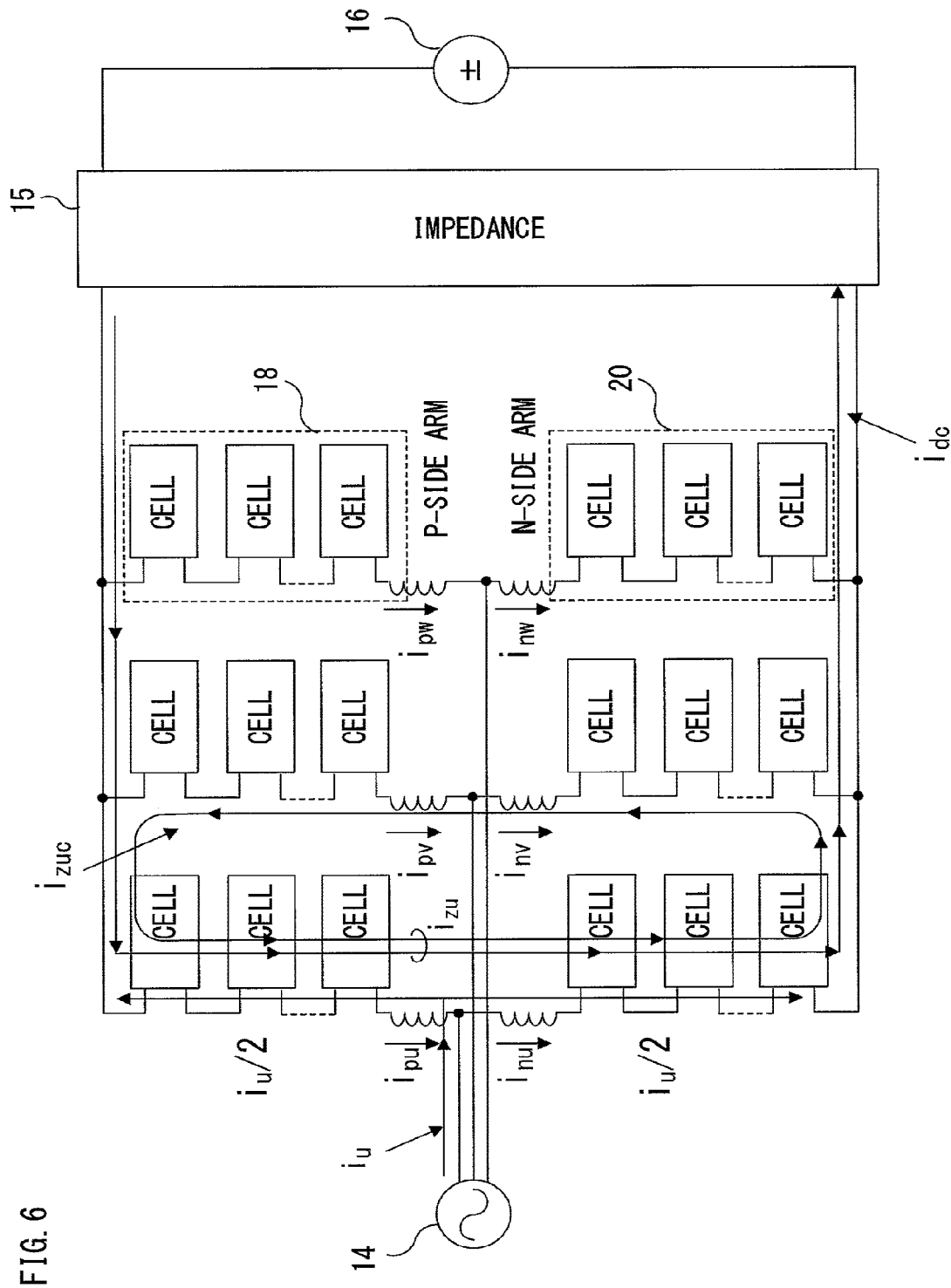
FIG. 6 is a diagram for explaining current elements flowing in the power conversion device.

In FIG. 6, for example, focusing on u phase, the current elements are as follows.

ipu: Current flowing in the first arm 18.

inu: Current flowing in the second arm 20.

iu: Current flowing via the AC power supply 14; the current iu is divided into half currents to the first arm 18 and the second arm 20 as shown in FIG. 6.

idc: Current flowing via the DC power supply 16, corresponding to three phases; one third of the current flows in u phase.

izu: A current component obtained by removing one second of the current iu flowing via the AC power supply 14, from the currents ipu and inu flowing in the arms 18 and 20; the following relationships are satisfied.

$$izu = ipu + iu/2 \quad (1)$$

$$izu = inu - iu/2 \quad (2)$$

izuc: A circulating current component circulating between the phases through the arms not via the AC power supply 14 and the DC power supply 16.

If the current iu is eliminated from expressions (1) and (2), the current component izu is obtained as shown by expression (3).

$$izu = (ipu + inu)/2 \quad (3)$$

Therefore, the circulating current component izuc is obtained as shown by expression (4).

$$izuc = izu - idc/3 \quad (4)$$

Returning to FIG. 5, currents ipu, ipv, ipw flowing in the first arms 18 for the respective phases and currents inu, inv, inw flowing in the second arms 20 for the respective phases, which are detected by an AC current detector (not shown), are respectively added by adders 54, and then multiplied by ½ by multipliers 55. Thus, current components izu, izv, izw for the respective phases obtained by removing current flowing via the AC power supply 14, from currents flowing in the arms 18 and 20, are calculated.

A DC current calculation unit 50 sums the current components izu, izv, izw for the respective phases, to calculate DC current izdc flowing via the DC power supply 16, and calculates the circulating current components izuc, izvc, izwc for the respective phases based on the DC current izdc and the current components izu, izv, izw for the respective phases, by expression (4).

In embodiment 1, the AC current detector (not shown), the adders 54, the multipliers 55, and the DC current calculation unit 50 compose circulating current calculation means in claims of the present application.

For the DC current izdc, DC current idc itself separately detected by a DC current detector (not shown) may be used. Although the DC current detector is needed, there is an advantage of reducing the calculation processing amount and also reducing error, as compared to the case of obtaining the DC current izdc through the calculation.

Figure 7:
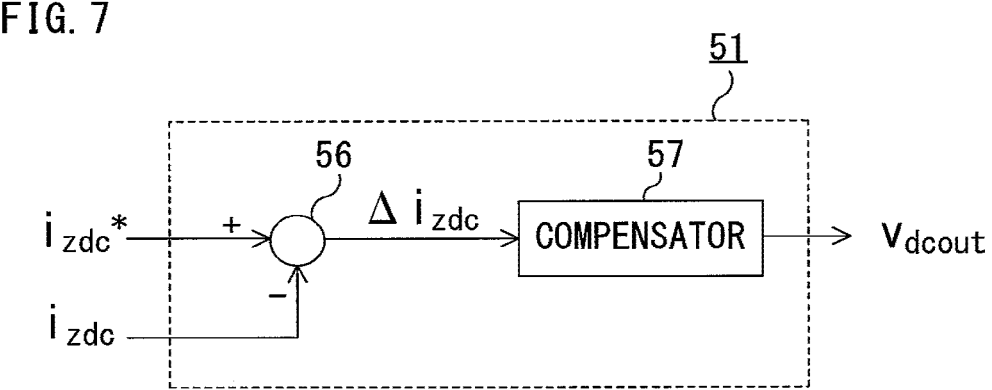
FIG. 7 is a block diagram showing an example of the internal configuration of a DC current control unit 51 in FIG. 5.

A DC current control unit 51, as shown in FIG. 7 which shows the internal configuration thereof, subtracts the DC current izdc from a predetermined DC current command value izdc* by a subtractor 56, to calculate error Δizdc relative to the command value, and calculates a DC voltage command DC current component vdcout by a compensator 57 so as to cause the calculated error Δizdc to be zero, that is, so as to cause the DC current izdc to follow the DC current command value izdc*.

Figure 8:
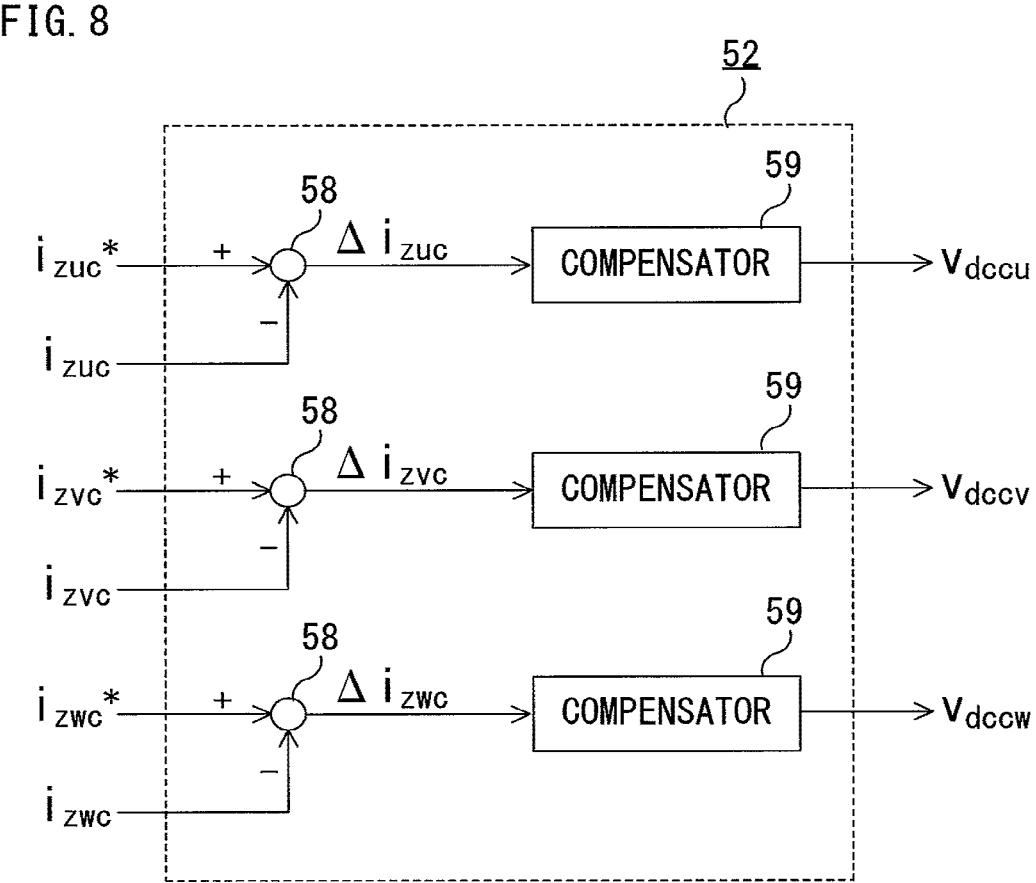
FIG. 8 is a block diagram showing an example of the internal configuration of a circulating current control unit 52 in FIG. 5.

A circulating current control unit 52, as shown in FIG. 8 which shows the internal configuration thereof, subtracts the circulating current components izuc, izvc, izwc for the respective phases calculated by the DC current calculation unit 50, from predetermined circulating current command values izuc*, izvc*, izwc* for the respective phases, by subtractors 58, to calculate errors Δizuc, Δizvc, Δizwc relative to the command values for the respective phases, and calculates DC voltage command circulating current components vdccu, vdccv, vdccw by compensators 59 so as to cause the calculated errors Δizuc, Δizvc, Δizwc for the respective phases to be zero, that is, so as to cause the circulating current components izuc, izvc, izwc for the respective phases to follow the circulating current command values izuc*, izvc*, izwc* for the respective phases.

Here, the manner of setting the circulating current command values will be described below.

As long as components of the unit cells 10 for the respective phases, and the like are ideally balanced, the circulating current command values may be set to zero. However, actually, considering variation in these components and the like among the phases, circulating current components for the respective phases that should be caused to flow in order to equalize voltages of the DC capacitors 34, 44 for the respective phases irrespective of presence of such variation are set as the circulating current command values.

In addition, if a condition of an AC system including the AC power supply 14 does not vary, the circulating current command values may be set to fixed values. However, for example, in the case where the degree of three-phase balance of the AC system varies, due to this variation, the DC capacitor voltage varies among the respective phases. Therefore, it may be required to sequentially calculate the circulating current command values through control based on the variation in voltages of the DC capacitors.

A circulating current command value calculation unit 100 calculates the circulating current command values izuc*, izvc*, izwc* considering the above circumstances. An example of the internal configuration thereof is shown in FIG. 9.

As described above, the command values may be fixed values or may be sequentially obtained through calculation. Therefore, the command values can be switched by switches 104.

Figure 9:
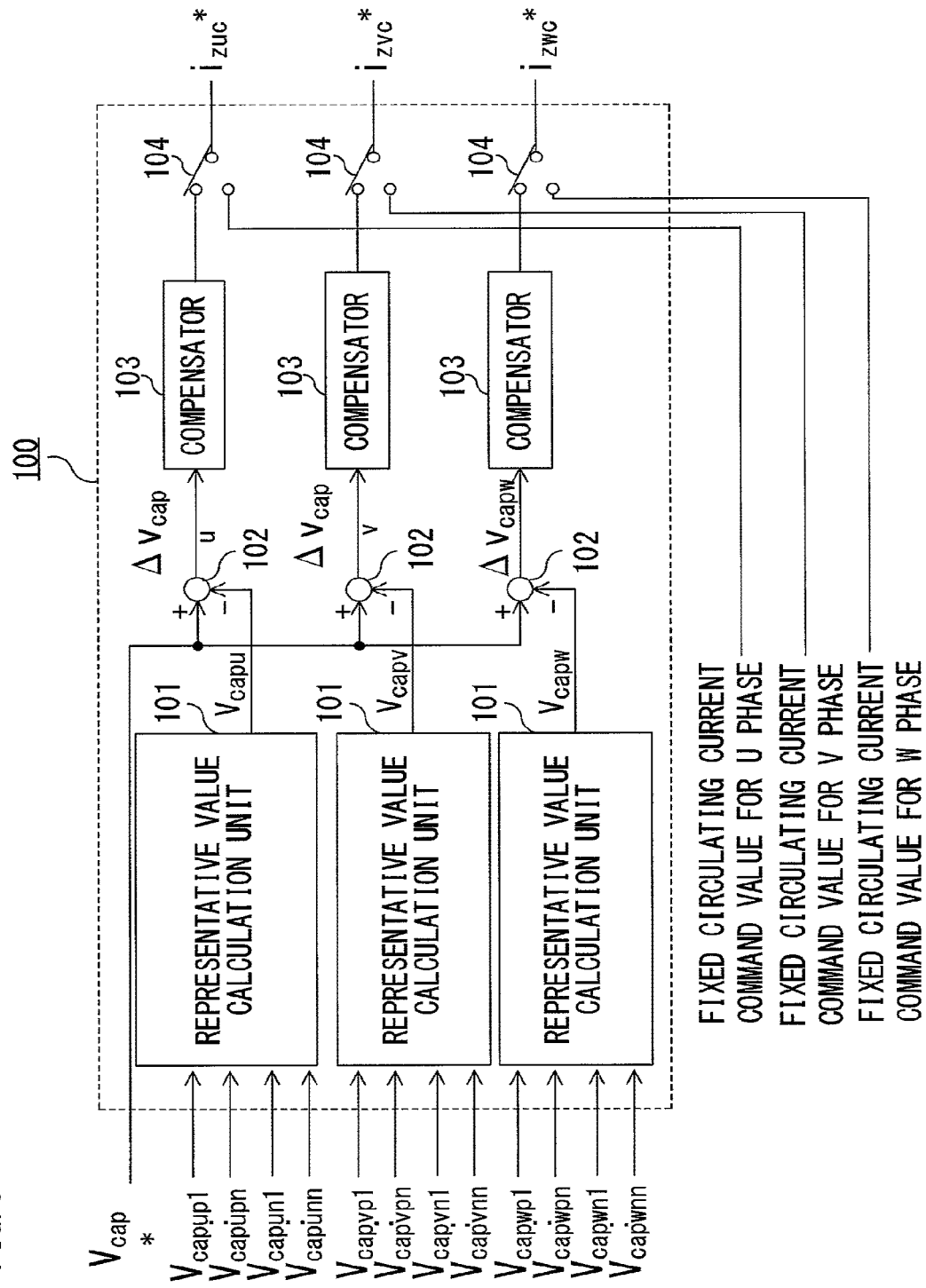
FIG. 9 is a block diagram showing an example of the internal configuration of a circulating current command value calculation unit 100 in FIG. 5.

In the case where the switch 104 selects a lower terminal in FIG. 9, considering variation in the components of the unit cells 10 and the like among the respective phases, the circulating current command value calculation unit 100 outputs fixed circulating current command values for U phase, V phase, W phase which are the circulating current components for the respective phases that should be caused to flow in order to equalize voltages of the DC capacitors 34, 44 for the respective phases irrespective of presence of such variation.

In the case where the switch 104 selects an upper terminal in FIG. 9, the circulating current command value calculation unit 100 outputs the circulating current command values izuc*, izvc*, izwc* in the following manner.

First, a DC capacitor representative value calculation unit 101 calculates representative values Vcapu, Vcapv, Vcapw of the DC capacitor voltages for the respective phases, based on voltage detection values of the DC capacitors for the respective phases, for example, regarding U phase, based on Vcapup1, . . . , Vcapupn of the first arm 18 and Vcapun1, . . . , Vcapunn of the second arm 20. The representative value may be maximum voltage or minimum voltage of the DC capacitor voltage for each phase, or may be average voltage for each phase.

Next, subtractors 102 subtract the DC capacitor voltage representative values Vcapu, Vcapv, Vcapw for the respective phases from a DC capacitor voltage command value Vcap*, to calculate errors ΔVcapu, ΔVcapv, ΔVcapw relative to the command values for the respective phases.

Then, compensators 103 calculate the circulating current command values izuc*, izvc*, izwc* so as to cause the calculated errors ΔVcapu, ΔVcapv, ΔVcapw for the respective phases to be zero, that is, so as to cause the DC capacitor voltage representative values Vcapu, Vcapv, Vcapw for the respective phases to follow the DC capacitor voltage command value Vcap*.

Thus, if the condition of the AC system including the AC power supply 14 does not vary, the circulating current command values may be set to fixed values, but as shown above, the circulating current command values may be sequentially calculated based on the detection values of the DC capacitor voltages. In this case, even if the AC system varies, the DC capacitor voltages for the respective phases can be always balanced.

Figure 10:
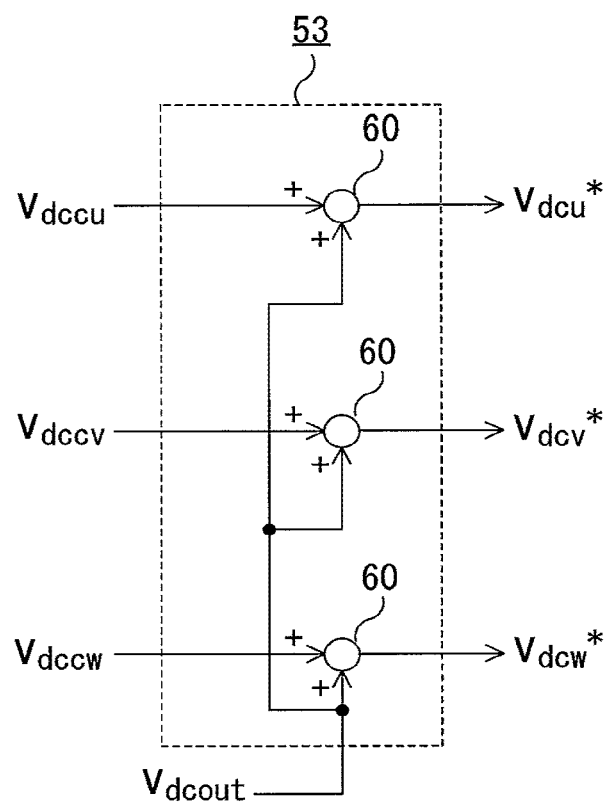
FIG. 10 is a block diagram showing an example of the internal configuration of a DC voltage command value calculation unit 53 in FIG. 5.

A DC voltage command value calculation unit 53, as shown in FIG. 10 which shows the internal configuration thereof, adds, by adders 60, the DC voltage command DC current component vdcout calculated by the DC current control unit 51 to the DC voltage command circulating current components vdccu, vdccv, vdccw for the respective phases calculated by the circulating current control unit 52, to calculate DC voltage command values vdcu*, vdcv*, vdcw* for the respective phases.

A DC voltage control unit 70 controls DC voltage to be outputted to the DC circuit, based on the DC voltage command values vdcu*, vdcv*, vdcw* for the respective phases. Specifically, the DC voltage control unit 70 controls ON/OFF driving for the switching elements 30, 40 composing the unit cells 10 in the arms for the respective phases.

As described above, the power conversion device of embodiment 1 of the present invention includes the circulating current calculation means composed of the DC current calculation unit 50 and the like, the circulating current control unit 52, and the DC voltage command value calculation unit 53, and thereby controls the circulating current component which directly influences variation in voltages of the DC capacitors 34, 44 of the unit cells 10 among the phases, independently of other current components, thus enabling reliable suppression of the variation.

More specifically, the circulating current control unit 52 is configured independently of the DC current control unit 51 which causes DC current to follow its command value. Therefore, it is possible to set optimum control responses for the respective control units 51 and 52 individually. In addition, even if the impedance 15 is inserted in the DC circuit including the DC power supply 16, variation in voltages of the DC capacitors 34, 44 of the unit cells 10 among the phases is reliably suppressed and proper control of DC current is realized, resulting in downsizing of the device.

As a case where an impedance is inserted in the DC circuit, for example, it is assumed that the power conversion device is applied to, for example, a high-voltage DC transmission facility (HVDC), and the DC circuit corresponds to a DC transmission system.

As a case where an unbalanced component is likely to exist in the AC circuit, for example, it is assumed that the power conversion device is applied to a frequency conversion facility (FC), and the AC circuit corresponds to an AC power system.

Embodiment 2

Figure 11:
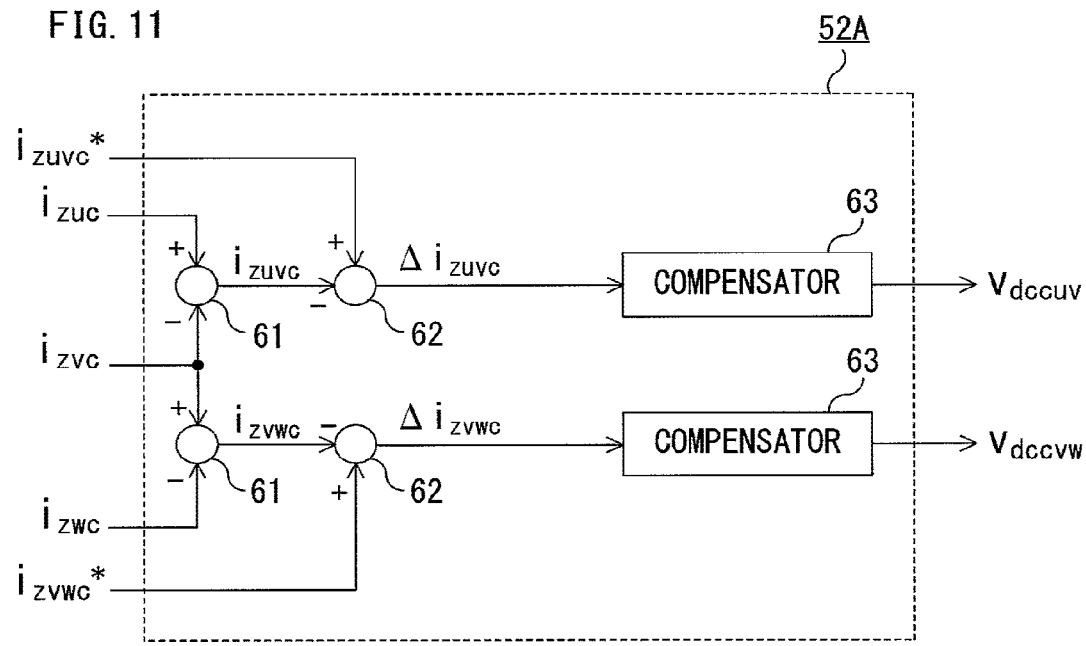
FIG. 11 is a block diagram showing an example of the internal configuration of a circulating current control unit 52A of a power conversion device according to embodiment 2 of the present invention.
Figure 12:
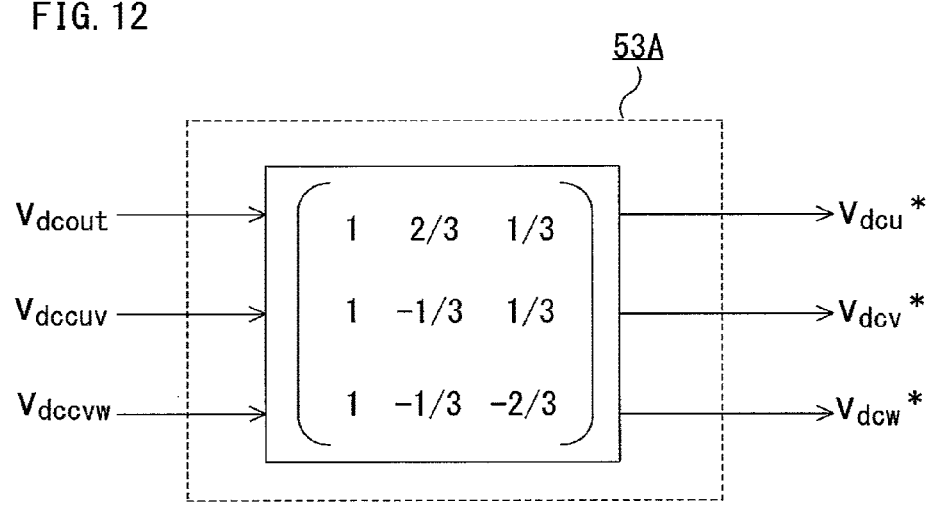
FIG. 12 is a block diagram showing an example of the internal configuration of a DC voltage command value calculation unit 53A of the power conversion device according to embodiment 2 of the present invention.

FIG. 11 and FIG. 12 are block diagrams showing the internal configurations of a circulating current control unit 52A and a DC voltage command value calculation unit 53A of a power conversion device according to embodiment 2 of the present invention. The other part is the same as in the above embodiment 1, so the description thereof is omitted.

In FIG. 11, first, the circulating current control unit 52A calculates, by subtractors 61, differences (here, izuc−izvc=izuvc, and izvc−izwc=izvwc) between one phase and the other two phases of the circulating current components izuc, izvc, izwc for the respective phases calculated by the DC current calculation unit 50. Next, by subtractors 62, the circulating current control unit 52A subtracts izuvc and izvwc from differences (here, izuc*−izvc*=izuvc*, and izvc*−izwc*=izvwc*) between one phase and the other two phases of the circulating current command values izuc*, izvc*, izwc* for the respective phases, to calculate errors Δizuvc, Δizvwc therebetween. Then, by compensators 63, the circulating current control unit 52A calculates DC voltage command circulating current components vdccuv, vdccvw so as to cause the calculated errors Δizuvc, Δizvwc to be zero.

Here, as the differences between the circulating current components for the respective phases, two currents of the current izuvc obtained by subtracting izvc from izuc and the current izvwc obtained by subtracting izwc from izvc are used. However, the current izwuc obtained by subtracting izuc from izwc and the current izuvc obtained by subtracting izvc from izuc may be used, or the current izwuc and the current izvwc may be used.

In FIG. 12, the DC voltage command value calculation unit 53A calculates the DC voltage command values vdcu*, vdcv*, vdcw* for the respective phases, based on the DC voltage command circulating current components vdccuv, vdccvw calculated by the circulating current control unit 52A, and the DC voltage command DC current component vdcout calculated by the DC current control unit 51, using the calculation shown in FIG. 12.

A sum of the circulating current components izuc, izvc, izwc are constrained at a predetermined value. Therefore, if the two differences between the circulating current components for the respective phases are made to coincide with the corresponding two differences between the circulating current command values for the respective phases, it becomes possible to substantially control the circulating current components izuc, izvc, izwc for the respective phases to follow the circulating current command values izuc*, izvc*, izwc* for the respective phases.

As described above, the power conversion device of embodiment 2 of the present invention includes the circulating current calculation means composed of the DC current calculation unit 50 and the like, the circulating current control unit 52A, and the DC voltage command value calculation unit 53A, and thereby controls the circulating current component which directly influences variation in voltages of the DC capacitors 34, 44 of the unit cells 10 among the phases, independently of other current components, thus enabling reliable suppression of the variation. Further, in addition to the effect of the above embodiment 1, the number of compensators 63 needed in the circulating current control unit 52A is reduced to two, resulting in simplification of the control configuration.

Embodiment 3

Figure 13:
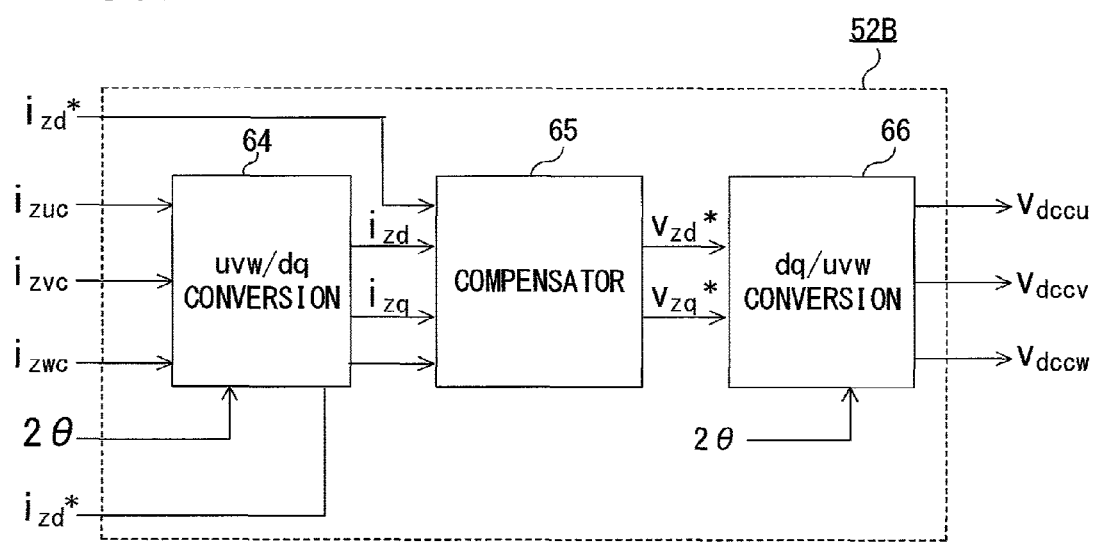
FIG. 13 is a block diagram showing an example of the internal configuration of a circulating current control unit 52B of a power conversion device according to embodiment 3 of the present invention.

FIG. 13 is a block diagram showing the internal configuration of a circulating current control unit 52B of a power conversion device according to embodiment 3 of the present invention. The other part is the same as in the above embodiment 1, so the description thereof is omitted.

The circulating current control unit 52B shown in FIG. 13 of embodiment 3 once converts the circulating current components for three phases of u, v, w to those for two phases of d, q in a rotational coordinate system.

A primary component of the circulating current component is the same frequency component as a fundamental wave frequency of an AC output component. As described in FIG. 6, regarding current outputted to the AC side, a component flowing in the first arm 18 and a component flowing in the second arm 20 have phases inverted from each other. However, regarding the circulating current component which circulates between the arms, a component flowing in the first arm 18 and a component flowing in the second arm 20 are the same component, i.e., components having the same polarity. Therefore, the circulating current component becomes a negative phase sequence component.

Accordingly, a first coordinate conversion unit 64 converts the circulating current components izuc, izvc, izwc for three phases of u, v, w calculated by the DC current calculation unit 50A, to those in a dq two-phase coordinate system rotating at a frequency that is two times the frequency of the AC output component. A component izd obtained by the conversion is an active component, a component izq obtained by the conversion is a reactive component, and these components are DC amounts.

A compensator 65 outputs DC voltage command two-axis components vzd*, vzq* so as to cause the circulating current components izd, izq for two phases to follow circulating current command two-axis components izd*, izq* obtained by conversion to two phases.

A second coordinate conversion unit 66 converts the DC voltage command two-axis components vzd*, vzq* obtained by the compensator 65, to the DC voltage command circulating current components vdccu, vdccv, vdccw for three phases.

As described above, the power conversion device of embodiment 3 of the present invention includes the circulating current calculation means composed of the DC current calculation unit 50 and the like, the circulating current control unit 52B, and the DC voltage command value calculation unit 53, and thereby controls the circulating current component which directly influences variation in voltages of the DC capacitors 34, 44 of the unit cells 10 among the phases, independently of other current components, thus enabling reliable suppression of the variation. Further, in addition to the effect of the above embodiment 1, a negative phase sequence component which is a primary component of the circulating current component is detected, and the primary component is controlled as a DC amount, whereby response of the circulating current control unit is improved.

In the above description, the power conversion device that performs power conversion between the three-phase AC circuit and the DC circuit has been described. However, the AC circuit of the present invention is not limited to a three-phase AC circuit. The present invention is generally applicable to a wide range of power conversion devices that perform power conversion between an AC circuit for plural phases such as two phases, and a DC circuit, and provides an equivalent effect in such cases.

The present invention does not essentially require the DC current control unit 51 that causes DC current to follow its command value. For example, the present invention is similarly applicable to the case of providing an AC voltage control unit that causes AC output voltage to follow its command value, and provides an equivalent effect in such a case.

It is noted that, within the scope of the present invention, the above embodiments may be freely combined with each other, or each of the above embodiments may be modified or abbreviated as appropriate.

The invention claimed is:

1. A power conversion device which is connected between an AC circuit for plural phases and a DC circuit and performs power conversion between the AC circuit and the DC circuit, the power conversion device comprising:
   a first arm and a second arm provided for each phase and having one ends connected in series to each other, wherein
   the first arm and the second arm are each composed of one or a plurality of unit cells connected in series to each other, each unit cell being composed of: a series unit including a plurality of semiconductor switches connected in series to each other; and a DC capacitor connected in parallel to the series unit, a terminal of the semiconductor switch serving as an output end of the unit cell,
   a connection point between the first arm and the second arm for each phase is connected to a corresponding phase of the AC circuit,
   another one end of the first arm for each phase is connected to a positive side of the DC circuit, and
   another one end of the second arm for each phase is connected to a negative side of the DC circuit,
   the power conversion device further comprising:
   circulating current calculation means for calculating a circulating current component for each phase which circulates between the respective phases not via the AC circuit and the DC circuit; and
   a circulating current control unit for controlling the circulating current component for each phase so as to follow a predetermined circulating current command value,
   the power conversion device thereby suppressing variation in voltages of the DC capacitors among the phases.

2. The power conversion device according to claim 1, wherein
   in the case where current flowing in the first arm for an m-th phase is ipm, current flowing in the second arm for the m-th phase is inm, DC current flowing in the DC circuit is idc, and the number of phases is M, the circulating current calculation means calculates the circulating current component izmc for the m-th phase by the following expression:

$izmc=(ipm+inm)/2-idc/M.$

3. The power conversion device according to claim 2, the power conversion device being applied to a high-voltage DC transmission facility in which the DC circuit is a DC power system or to a frequency conversion facility in which the AC circuit is an AC power system.

4. The power conversion device according to claim 1, wherein
   in the case where the AC circuit has three phases of u, v, w, the circulating current control unit controls differences between one phase and the other two phases of the circulating current components calculated by the circulating current calculation means so as to follow differences between one phase and the other two phases of the circulating current command values, thereby causing the circulating current component for each phase to follow the circulating current command value.

5. The power conversion device according to claim 4, the power conversion device being applied to a high-voltage DC transmission facility in which the DC circuit is a DC power system or to a frequency conversion facility in which the AC circuit is an AC power system.

6. The power conversion device according to claim 1, wherein
   in the case where the AC circuit has three phases of u, v, w, the circulating current control unit performs control so that two-axis components obtained by converting the circulating current components for the three phases calculated by the circulating current calculation means to those in a coordinate system rotating at a frequency that is two times an AC frequency of the AC circuit, follow predetermined circulating current command two-axis components, respectively, thereby causing the circulating current component for each phase to follow the circulating current command value.

7. The power conversion device according to claim 6, the power conversion device being applied to a high-voltage DC transmission facility in which the DC circuit is a DC power system or to a frequency conversion facility in which the AC circuit is an AC power system.

8. The power conversion device according to claim 1, wherein
   one or both of the first arm and the second arm have an arm reactor for suppressing the circulating current component, the arm reactor being inserted in series to the unit cell.

9. The power conversion device according to claim 8, the power conversion device being applied to a high-voltage DC transmission facility in which the DC circuit is a DC power system or to a frequency conversion facility in which the AC circuit is an AC power system.

10. The power conversion device according to claim 1, further comprising:
    a circulating current command value calculation unit including a DC capacitor voltage representative value calculation unit for calculating a representative value of voltage of the DC capacitor for each phase, the circulating current command value calculation unit calculating the circulating current command value for each phase so as to cause the representative value of voltage of the DC capacitor for each phase to follow a predetermined DC capacitor voltage command value.

11. The power conversion device according to claim 10, the power conversion device being applied to a high-voltage DC transmission facility in which the DC circuit is a DC power system or to a frequency conversion facility in which the AC circuit is an AC power system.

12. The power conversion device according to claim 1, further comprising:
    a DC voltage control unit for controlling DC voltage to be outputted to the DC circuit, based on a DC voltage command value; and
    a DC current control unit for outputting a DC voltage command DC current component so as to cause DC current flowing in the DC circuit to follow a predetermined DC current command value, wherein
    the circulating current control unit outputs a DC voltage command circulating current component so as to cause the circulating current component for each phase to follow the circulating current command value, and
    the DC voltage control unit controls the DC voltage to be outputted to the DC circuit, based on the DC voltage command value composed of the DC voltage command DC current component and the DC voltage command circulating current component.

13. The power conversion device according to claim 12, the power conversion device being applied to a high-voltage DC transmission facility in which the DC circuit is a DC power system or to a frequency conversion facility in which the AC circuit is an AC power system.

14. The power conversion device according to claim 12, wherein
control responses of the DC current control unit and the circulating current control unit are allowed to be set independently of each other.

15. The power conversion device according to claim 14, the power conversion device being applied to a high-voltage DC transmission facility in which the DC circuit is a DC power system or to a frequency conversion facility in which the AC circuit is an AC power system.

16. The power conversion device according to claim 1, the power conversion device being applied to a high-voltage DC transmission facility in which the DC circuit is a DC power system or to a frequency conversion facility in which the AC circuit is an AC power system.

* * * * *